United States Patent
Jiang et al.

(10) Patent No.: US 11,025,682 B2
(45) Date of Patent: Jun. 1, 2021

(54) METHODS AND SYSTEMS FOR WIRELESS TRANSMISSION OF AUXILIARY STREAM DATA BASED ON VIDEO CONFERENCE SYSTEMS

(71) Applicant: YEALINK (XIAMEN) NETWORK TECHNOLOGY CO., LTD., Fujian (CN)

(72) Inventors: Hu Jiang, Fujian (CN); Zhizhong Ouyang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/714,740

(22) Filed: Dec. 15, 2019

(65) Prior Publication Data

US 2020/0195697 A1    Jun. 18, 2020

(30) Foreign Application Priority Data

Dec. 17, 2018 (CN) .......................... 201811544107.7

(51) Int. Cl.
*H04L 29/06* (2006.01)

(52) U.S. Cl.
CPC ...... *H04L 65/1096* (2013.01); *H04L 65/1076* (2013.01); *H04L 65/1093* (2013.01); *H04L 65/608* (2013.01)

(58) Field of Classification Search
CPC ............... H04L 65/1096; H04L 65/608; H04L 65/1093; H04L 65/1076
See application file for complete search history.

(56) References Cited

U.S. PATENT DOCUMENTS

| | | | |
|---|---|---|---|
| 2014/0082227 A1* | 3/2014 | Beel .................... | H04N 7/15 710/11 |
| 2014/0092203 A1* | 4/2014 | Periyannan ............ | H04N 7/152 348/14.09 |
| 2016/0080693 A1* | 3/2016 | Wu ...................... | H04N 7/15 348/14.02 |
| 2017/0235560 A1* | 8/2017 | McLean ............... | G06F 3/03545 717/168 |

* cited by examiner

*Primary Examiner* — Arvin Eskandarnia
*Assistant Examiner* — Chhian (Amy) Ling

(57) ABSTRACT

Disclosed herein are a method and a system for wireless transmission of auxiliary stream data based on a video conference system. The method comprises: connecting a first auxiliary stream device to the master of the video conference via wireless pairing; running a screening software by a second auxiliary stream device; transferring the audio and video data of the second auxiliary stream device to the master of the video conference via the screening software. The method and the system as provided herein can solve the problems which may be caused by being incompatible with audio and video interface cables, thereby improving participants' experience.

7 Claims, 3 Drawing Sheets

METHODS AND SYSTEMS FOR WIRELESS TRANSMISSION OF AUXILIARY STREAM DATA BASED ON VIDEO CONFERENCE SYSTEMS

RELATED APPLICATIONS

This application claims priority to Chinese Application Serial Number 201811544107.7, filed on Dec. 17, 2018, which is herein incorporated by reference.

FIELD OF THE DISCLOSURE

The present disclosure relates to a video conference technology, more particularly, to a method and a system for wireless transmission of auxiliary stream data based on a video conference system.

BACKGROUND OF THE DISCLOSURE

One of the most important scenes in video conference systems is an auxiliary stream sharing scene. Traditional auxiliary stream sharing is achieved by collecting audio and video data via cables of audio and video interfaces and then transferring the data to the master of the video conference system via wired network. However, the application scenes of such traditional method are limited.

(1) Current auxiliary stream sharing devices may comprise PCs, laptops, and tablet PCs, which have various interfaces, leading to lack of compatibility. Even the tablet PCs have no interfaces for outputting audio and video. Therefore, the method including collection of audio and video via audio and video interfaces will have limited applications.

(2) During the conference, the speaker may make presentation while walking. Therefore, inputting via cables and transmission via wired network are not suitable for this situation.

SUMMARY OF THE DISCLOSURE

Provided herein are a method and a system for wireless transmission of auxiliary stream data based on a video conference system, which may solve the problems caused by being incompatible with and dependent on audio and video interface cables used in the traditional auxiliary stream devices, and effectively improve the experience of the users, thereby enhancing conference experience for the participants of the video conference.

In one aspect, provided herein is a method for wireless transmission of auxiliary stream data based on a video conference system, comprising the following steps:

connecting a first auxiliary stream device to the master of the video conference via wireless pairing and automatically updating a screening software, in response to a request for wireless pairing of a first auxiliary stream device, according to a wireless pairing information preset in the first auxiliary stream device, wherein the screening software is stored in the first auxiliary stream device;

running the screening software by a second auxiliary stream device, in response to an operation request inputted by a user to the screening software, according to the said operation request, wherein the second auxiliary stream device is connected to the first USB interface of the first auxiliary stream device via a second USB interface and is supplied with power;

transferring the audio and video data of the second auxiliary stream device to the first auxiliary stream device by the screening software so as to transfer the audio and video data to the master of the video conference from the first auxiliary stream device via wireless pairing connection, thereby achieving wireless transmission of auxiliary stream data;

wherein, the automatically updating the screening software specifically comprises:

judging the software versions of the screening software in the master of the video conference and the first auxiliary stream device, wherein if the software version of the screening software in the master of the video conference is higher than that in the first auxiliary stream device, the screening software in the master of the video conference is copied to cover the screening software in the first auxiliary stream device, and wherein if the software version of the screening software in the master of the video conference is lower than that in the first auxiliary stream device, there is no need to update the screening software in the first auxiliary stream device.

Further, presetting wireless pairing information in the first auxiliary stream device specifically comprises:

performing wireless pairing with the first auxiliary stream device by the master of the video conference, in response to and according to an access request from the first auxiliary stream device and generating wireless pairing information; wherein the first auxiliary stream device is connected to the master of the video conference via the first USB interface;

writing the wireless pairing information into the first auxiliary stream device by the master of the video conference via the first USB interface.

Further, transferring the data of the second auxiliary stream device to the master of the video conference via the screening software to achieve wireless transmission of auxiliary stream data specifically comprises:

collecting and coding the audio and video data of the second auxiliary stream device according to the interface provided by the second auxiliary stream device to obtain the coded audio and video data which is transferred to the first auxiliary stream device; wherein the audio and video data is transferred to the master of the video conference by the first auxiliary stream device via a wireless interface.

Further, the wireless pairing information comprises: hotspot names, hotspot passwords and channel information.

In another aspect, provided herein is a system for wireless transmission of auxiliary stream data based on a video conference system, comprising: a pairing module, an operation module and a data transmission module.

The pairing module connects a first auxiliary stream device to the master of the video conference through wireless pairing and automatically updates a screening software, in response to a request for wireless pairing of the first auxiliary stream device, according to wireless pairing information preset in the first auxiliary stream device, wherein the screening software is stored in the first auxiliary stream device.

The operation module operates the screening software through a second auxiliary stream device in response to an operation request inputted by the user to the screening software, according to the said operation request, wherein the second auxiliary stream device is connected to a first USB interface of the first auxiliary stream device via a second USB interface of the second auxiliary stream device and is supplied with power.

The data transmission module is used to transfer the audio and video data of the second auxiliary stream device to the first auxiliary stream device via the screening software, to transfer the audio and video data to the master of the video conference by the first auxiliary stream device via wireless pairing connection, thereby achieving wireless transmission of auxiliary stream data.

Further, the data transmission module is specifically used to collect and code the audio and video data of the second auxiliary stream device according to the interface provided by the second auxiliary stream device, so as to obtain coded audio and video data, which is then transferred to the first auxiliary stream device, wherein the first auxiliary stream device transfers the audio and video data to the master of the video conference according to the wireless interface.

Further, the first auxiliary stream device comprises a HID device and a CDROM device.

Provided herein are a method and a system for wireless transmission of auxiliary stream data based on a video conference, which can solve the problems caused by being incompatible with and dependent on audio and video interface cables used in the traditional auxiliary stream devices and effectively improve experience of the users, thereby enhancing experience of the participants of the video conference.

DETAILED DESCRIPTION OF THE DISCLOSURE

Several aspects of the disclosure are described below in details by reference to appended drawings and specific embodiments. The skilled in the art should understand that the embodiments are set forth to provide an illustration, rather than limit the scope of the present disclosure. The scope of the present disclosure is limited by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Figure 1:
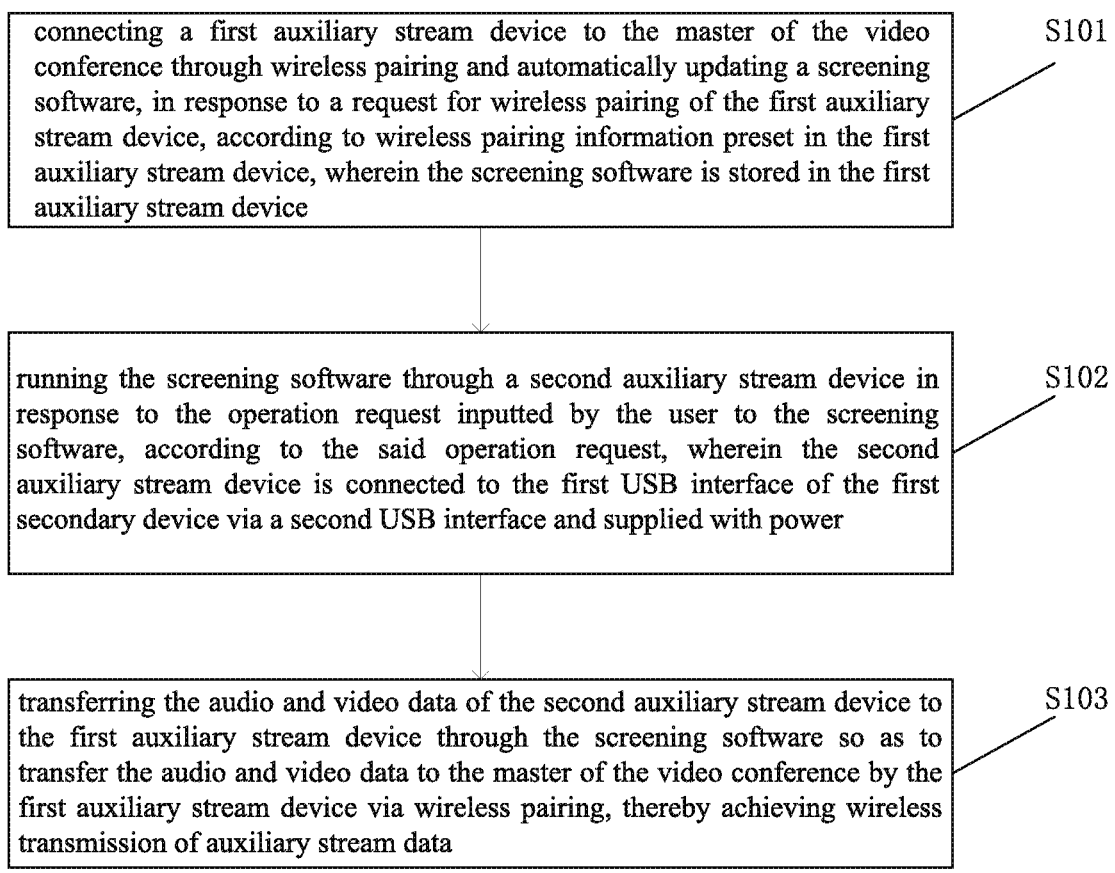
FIG. 1 is a flow diagram illustrating a method for wireless transmission of auxiliary stream data based on a video conference as described herein.

Referring to FIG. 1, a method for wireless transmission of auxiliary stream data based on a video conference is provided, comprising the following steps:

S101. connecting a first auxiliary stream device to the master of the video conference through wireless pairing and automatically updating a screening software, in response to a request for wireless pairing of the first auxiliary stream device, according to wireless pairing information preset in the first auxiliary stream device, wherein the screening software is stored in the first auxiliary stream device;

S102. running the screening software through a second auxiliary stream device in response to the operation request inputted by the user to the screening software, according to the said operation request, wherein the second auxiliary stream device is connected to the first USB interface of the first secondary device via a second USB interface and supplied with power;

S103. transferring the audio and video data of the second auxiliary stream device to the first auxiliary stream device through the screening software so as to transfer the audio and video data to the master of the video conference by the first auxiliary stream device via wireless pairing, thereby achieving wireless transmission of auxiliary stream data;

wherein automatically updating the screening software specifically comprises: judging the software versions of the screening software in the master of the video conference and the first auxiliary stream device, wherein if the software version in the master of the video conference is higher than that in the first auxiliary stream device, the screening software in the master of the video conference is copied to cover the one in the first auxiliary stream device; and wherein if the software version in the master of the video conference is lower than that in the first auxiliary stream device, there is no need to update the screening software in the first auxiliary stream device.

In some examples, the second auxiliary stream device comprises: PCs, laptops and tablet PCs. When pairing and connecting the first auxiliary stream device with the master of the video conference, the screening software in the first auxiliary stream device is automatically updated without being operated and known by the user, such that the screening efficiency is enhanced so as to improve user's screening experience. When the second auxiliary stream device accesses into the first auxiliary stream device for the first time, it needs to manually press the loader program stored in the CDROM device in the first auxiliary stream device, such that the loader program is ran at the backstage. Therefore, there is no need to manually press the said program when the second auxiliary stream device accesses into the first auxiliary stream device in the future. The loader program is firstly able to judge whether the storage directory of the screening software in the second auxiliary stream device includes screening software. If NOT, the screening software is copied to the said list and then the screening software is operated. If YES, the software version in the said list is compared with that in the CDROM device. If the software version in the said list is not lower than that in the CDROM device, the screening software in the said list is operated directly. If the software version in the said list is lower than that in the CDROM device, the screening software in the CDROM device is copied to cover that in the said list and then the screening software is operated. As such, initiation of the screening software can be expedited, and the participants would obtain screening experience with increased speed.

Figure 2:
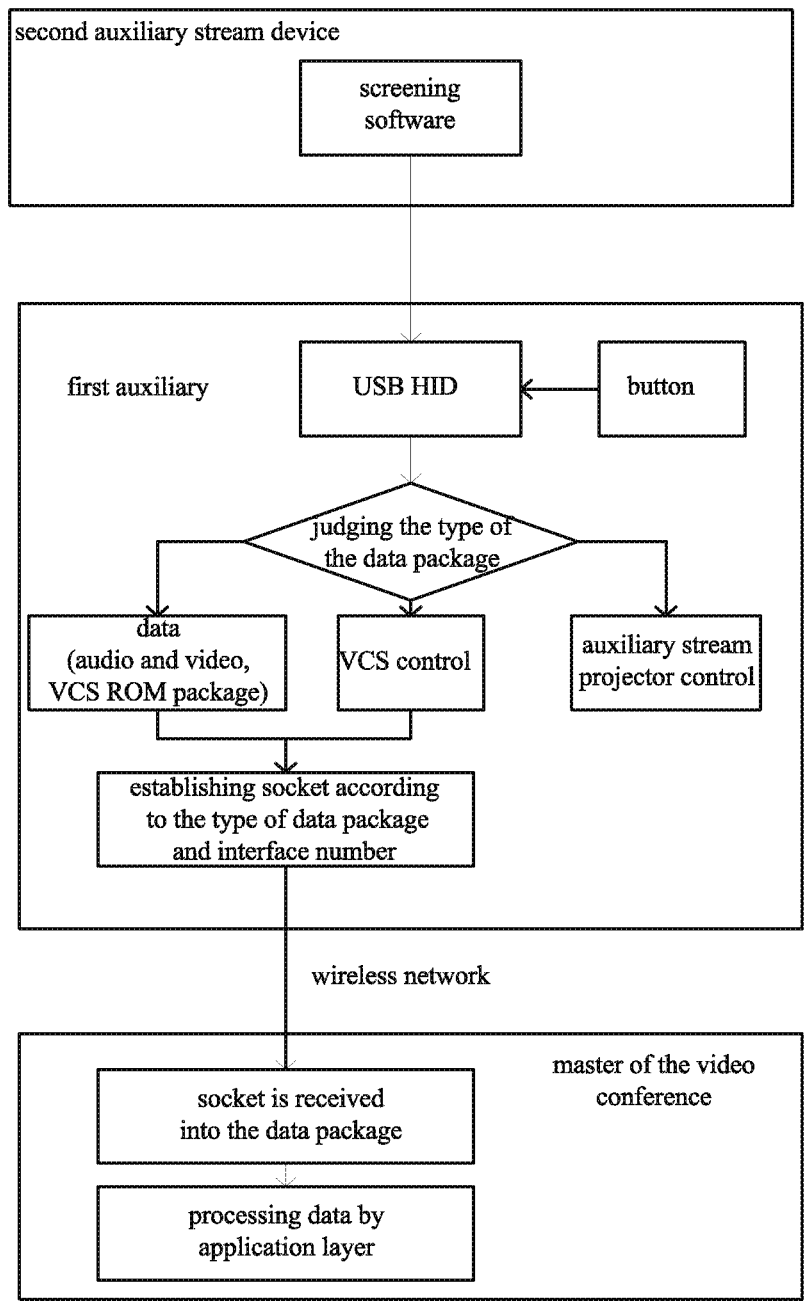
FIG. 2 is a block diagram illustrating the principle of the method for wireless transmission of auxiliary stream data based on a video conference as described herein.

Referring to FIG. 2, it is a block diagram illustrating the principle of the method for wireless transmission of auxiliary stream data based on a video conference as described herein. The socket which is established in the first auxiliary stream device is transferred to the master of the video conference via wireless network. The socket is received into the data package through the master of the video conference and then the data in the data package is processed by the application layer and then outputted.

In some embodiments, presetting wireless pairing information in the first auxiliary stream device specifically comprises:

performing wireless pairing with the first auxiliary stream device by the master of the video conference in response to and according to the accessing request of the first auxiliary stream device and generating the wireless pairing information, wherein the first auxiliary stream device is connected to the master of the video conference through the first USB interface;

writing the wireless pairing information into the first auxiliary stream device by the master of the video conference through the first USB interface.

In some examples, USB connection between the master of the video conference and the first auxiliary stream device is disconnected after writing the wireless pairing information into the first auxiliary stream device by the master of the video conference through the first USB interface.

In some embodiments, transferring the data of the second auxiliary stream device to the master of the video conference via the screening software to achieve wireless transmission of auxiliary stream data specifically comprises:

collecting and coding the audio and video data of the second auxiliary stream device according to the interface provided by the second auxiliary stream device to obtain the coded audio and video data which is transferred to the first auxiliary stream device, wherein the first auxiliary stream device transfers the audio and video data to the master of the video conference.

In some examples, the first auxiliary stream device comprises a HID device and a CDROM device. The screening software is stored in the CDROM device. The audio and video data is transferred to the first secondary device by the screening software through the interface of the HID device.

In some embodiments, the wireless pairing information includes hotspot names, hotspot passwords and channel information.

In some examples, the first auxiliary stream device is automatically connected to the master of the video conference via wireless pairing information to facilitate increase of the connection speed of the device. Meanwhile, the passwords are set by hotspot, such that decrease of data transmission speed due to accession of other devices into the master of the video conference can be avoided, thereby enhancing transmission efficiency of wireless transmission of auxiliary stream data and improving participants' experience.

Figure 3:
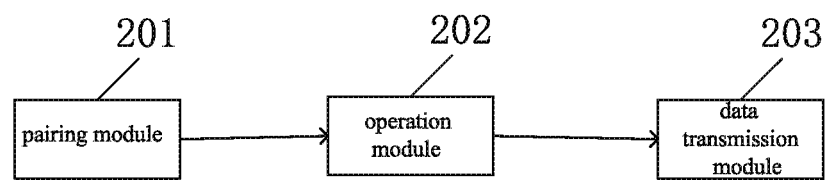
FIG. 3 is a structural schematic diagram illustrating a system for wireless transmission of auxiliary stream data based on a video conference as described herein.

Referring to FIG. 3, a system for wireless transmission of auxiliary stream data based on a video conference system is provided, comprising: a pairing module 201, an operation module 202 and a data transmission module 203;

wherein:

the pairing module 201 allows the first auxiliary stream device to connect to the master of the video conference via wireless pairing and automatically update the screening software in response to a request for wireless pairing of the first auxiliary stream device, according to the wireless pairing information preset in the first auxiliary stream device;

the operation module 202 operates the screening software through the second auxiliary stream device in response to the operation request inputted by the user to the screening software according to the said operation request, wherein the second auxiliary stream device is connected to the first USB interface of the first auxiliary stream device through the second USB interface and is supplied with power;

the data transmission module 203 is used to transfer the audio and video data of the second auxiliary stream device to the first auxiliary stream device through the screening software so as to transfer the audio and video data to the master of the video conference by the first auxiliary stream device via wireless pairing, thereby achieving wireless transmission of auxiliary stream data.

In some examples, the second auxiliary stream device comprises: PCs, laptops and tablet PCs. When pairing and connecting the first auxiliary stream device with the master of the video conference, the screening software in the first auxiliary stream device is automatically updated without being operated and known by the user, such that the screening efficiency is enhanced so as to improve user's screening experience. When the second auxiliary stream device accesses into the first auxiliary stream device for the first time, it needs to manually press the loader program stored in the CDROM device in the first auxiliary stream device, such that the loader program is ran at the backstage. Therefore, there is no need to manually press the said program when the second auxiliary stream device accesses into the first auxiliary stream device in the future. The loader program is firstly able to judge whether the storage list of the screening software in the second auxiliary stream device includes screening software. If NOT, the screening software is copied to the said list and then the screening software is operated. If YES, the software version in the said list is compared with that in the CDROM device. If the software version in the said list is not lower than that in the CDROM device, the screening software in the said list is operated directly. If the software version in the said list is lower than that in the CDROM device, the screening software in the CDROM device is copied to cover that in the said list and then the screening software is operated. As such, initiation of the screening software can be expedited, and the participants would obtain screening experience with increased speed.

Referring to FIG. 2, it is a block diagram illustrating the principle of the method for wireless transmission of auxiliary stream data based on a video conference as described herein. The socket which is established in the first auxiliary stream device via wireless network is transferred to the master of the video conference. The socket is received into the data package through the master of the video conference and then the data in the data package is treated by the application layer. The treated audio and video data is then outputted.

In some embodiments, the data transmission module is specifically used to collect and code the audio and video data of the second auxiliary stream device according to the interface provided by the second auxiliary stream device to obtain the coded audio and video data which is transferred to the first auxiliary stream device, wherein the first auxiliary stream device transfers the audio and video data to the master of the video conference.

In some embodiments, the first auxiliary stream device comprises a HID device and a CDROM device.

In some examples, the CDROM device is used to store the screening software and the HID device is used to provide an interface for transferring the audio and video data to the first auxiliary stream device by the screening software.

The present disclosure achieves the following advantageous effects.

Provided herein are a method and a system for wireless transmission of auxiliary stream data based on a video conference system. The devices can be connected together by way of USB and wireless pairing and the screening software in the first auxiliary stream device can be automatically updated. As such, the screening experience of the participants of the video conference can be effectively improved and meanwhile, the problems which may be caused by being incompatible with and dependent on audio and video interface cables used in the traditional auxiliary stream devices can be effectively solved and the users' experience can be effectively enhanced, thereby improving the experience of the participants for the video conference.

The foregoing is provided for illustration, and does not intend to limit the present disclosure. Any changes and modifications for the above embodiments come within the scope of the present disclosure.

The invention claimed is:

1. A method for wireless transmission of auxiliary stream data based on a video conference system, comprising the following steps:
   connecting a first auxiliary stream device to a master device of the video conference system via wireless pairing and automatically updating a screening software, in response to a request for wireless pairing of the first auxiliary stream device, according to a wireless pairing information preset in the first auxiliary stream device, wherein the screening software is stored in the first auxiliary stream device;
   wherein, the automatically updating the screening software specifically comprises:
   judging software versions of the screening software in the master device of the video conference system and the first auxiliary stream device, wherein if the software version of the screening software in the master device of the video conference system is higher than that in the first auxiliary stream device, the screening software in the master device of the video conference system is copied to cover the screening software in the first auxiliary stream device, and wherein if the software version of the screening software in the master device of the video conference system is lower than that in the first auxiliary stream device, there is no need to update the screening software in the first auxiliary stream device;
   running the screening software by a second auxiliary stream device, in response to an operation request inputted by a user to the screening software, according to the said operation request, wherein the second auxiliary stream device is connected to the first USB interface of the first auxiliary stream device via a second USB interface and is supplied with power,
   wherein, when the second auxiliary stream device accesses into the first auxiliary stream device for the first time, a loader program stored in a CDROM device in the first auxiliary stream device is manually pressed, then the loader program is run at a backstage, the loader program is not manually pressed when the second auxiliary stream device accesses into the first auxiliary stream device in the future, the loader program is firstly able to judge whether a storage list of the screening software in the second auxiliary stream device includes a screening software, if not, the screening software is copied to the storage list and then the screening software is operated, if yes, the software version in the storage list is compared with that in the CDROM device in the first auxiliary stream device, if the software version in the storage list is not lower than that in the CDROM device, the screening software in the storage list is operated directly, if the software version in the storage list is lower than that in the CDROM device, the screening software in the CDROM device is copied to cover that in the storage list and then the screening software is operated,
   transferring the audio and video data of the second auxiliary stream device to the first auxiliary stream device via the screening software so as to transfer the audio and video data to the master device of the video conference system from the first auxiliary stream device via wireless pairing connection, thereby achieving wireless transmission of auxiliary stream data.

2. The method for wireless transmission of auxiliary stream data based on the video conference system according to claim 1, wherein presetting wireless pairing information in the first auxiliary stream device specifically comprises:
   performing wireless pairing with the first auxiliary stream device by the master device of the video conference system, in response to and according to an access request from the first auxiliary stream device and generating wireless pairing information; wherein the first auxiliary stream device is connected to the master device of the video conference system via the first USB interface;
   writing the wireless pairing information into the first auxiliary stream device by the master device of the video conference system via the first USB interface.

3. The method for wireless transmission of auxiliary stream data based on the video conference system according to claim 1, wherein transferring the data of the second auxiliary stream device to the master device of the video conference system via the screening software to achieve wireless transmission of auxiliary stream data specifically comprises:
   collecting and coding the audio and video data of the second auxiliary stream device according to the interface provided by the second auxiliary stream device to obtain the coded audio and video data which is transferred to the first auxiliary stream device; wherein the audio and video data is transferred to the master device of the video conference system by the first auxiliary stream device via a wireless interface.

4. The method for wireless transmission of auxiliary stream data based on the video conference system according to claim 1, wherein the wireless pairing information comprises: hotspot names, hotspot passwords and channel information.

5. A system for wireless transmission of auxiliary stream data based on a video conference system, comprising: a pairing module, an operation module and a data transmission module,
   wherein:
   the pairing module connects a first auxiliary stream device to a master device of the video conference system through wireless pairing and automatically updates a screening software, in response to a request for wireless pairing of the first auxiliary stream device, according to wireless pairing information preset in the first auxiliary stream device and for, wherein the screening software is stored in the first auxiliary stream device;
   wherein, the automatically updating the screening software specifically comprises:
   judging software versions of the screening software in the master device of the video conference system and the first auxiliary stream device, wherein if the software version of the screening software in the master device of the video conference system is higher than that in the first auxiliary stream device, the screening software in the master device of the video conference system is copied to cover the screening software in the first auxiliary stream device, and wherein if the software version of the screening software in the master device of the video conference system is lower than that in the first auxiliary stream device, there is no need to update the screening software in the first auxiliary stream device;

the operation module operates the screening software through a second auxiliary stream device according to an operation request, in response to the operation request inputted by the user to the screening software, wherein the second auxiliary stream device is connected to a first USB interface of the first auxiliary stream device via a second USB interface of the second auxiliary stream device and is supplied with power, wherein, when the second auxiliary stream device accesses into the first auxiliary stream device for the first time, a loader program stored in a CDROM device in the first auxiliary stream device is manually pressed, then the loader program is run at a backstage, the loader program is not manually pressed when the second auxiliary stream device accesses into the first auxiliary stream device in the future, the loader program is firstly able to judge whether a storage list of the screening software in the second auxiliary stream device includes a screening software; if not, the screening software is copied to the storage list and then the screening software is operated, if yes, the software version in the storage list is compared with that in the CDROM device in the first auxiliary stream device, if the software version in the storage list is not lower than that in the CDROM device, the screening software in the storage list is operated directly, if the software version in the storage list is lower than that in the CDROM device, the screening software in the CDROM device is copied to cover that in the storage list and then the screening software is operated, the data transmission module is used to transfer the audio and video data of the second auxiliary stream device to the first auxiliary stream device via the screening software, to transfer the audio and video data to the master device of the video conference system by the first auxiliary stream device via wireless pairing connection, thereby achieving wireless transmission of auxiliary stream data.

6. The system for wireless transmission of auxiliary stream data based on the video conference system according to claim 5, wherein the data transmission module is specifically used to collect and code the audio and video data of the second auxiliary stream device according to the interface provided by the second auxiliary stream device, so as to obtain coded audio and video data, which is then transferred to the first auxiliary stream device, wherein the first auxiliary stream device transfers the audio and video data to the master device of the video conference system according to the wireless interface.

7. The system for wireless transmission of auxiliary stream data based on the video conference system according to claim 5, wherein the first auxiliary stream device comprises a HID device and a CDROM device.

\* \* \* \* \*